(No Model.)
O. A. ENHOLM.
SUPPLY SYSTEM FOR ELECTRIC RAILWAYS.
No. 540,653. Patented June 11, 1895.
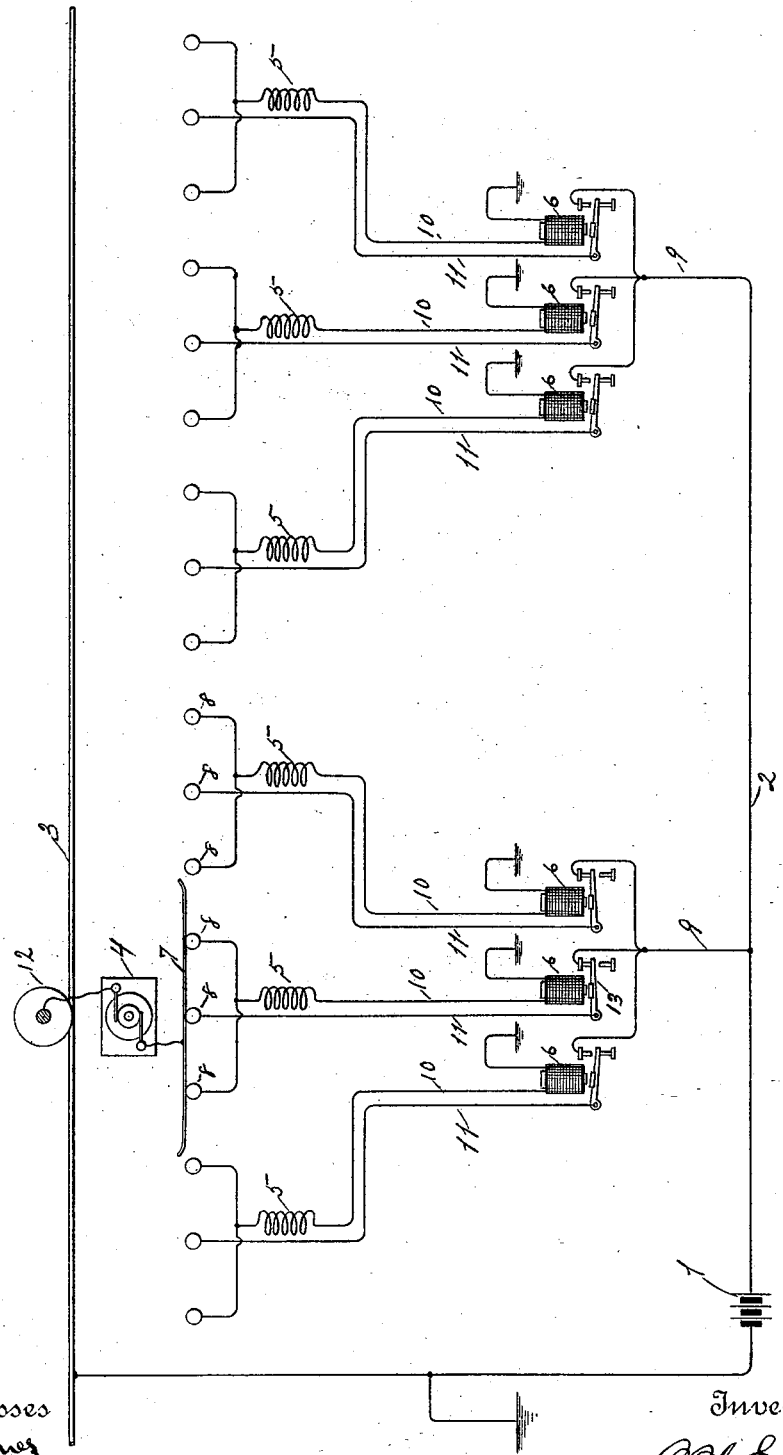

UNITED STATES PATENT OFFICE.

OSCAR A. ENHOLM, OF NEW YORK, N. Y., ASSIGNOR, BY MESNE ASSIGNMENTS, TO THE ELECTRO-MAGNETIC TRACTION COMPANY, OF WASHINGTON, DISTRICT OF COLUMBIA.

SUPPLY SYSTEM FOR ELECTRIC RAILWAYS.

SPECIFICATION forming part of Letters Patent No. 540,653, dated June 11, 1895.

Application filed November 3, 1891. Serial No. 410,744. (No model.)

*To all whom it may concern:*

Be it known that I, OSCAR A. ENHOLM, a citizen of the United States, and a resident of New York, in the county of New York and State of New York, have invented certain new and useful Improvements in Electric Rail Systems, of which the following is a specification.

The object of my invention is to construct and operate a simple and efficient electric railway system adapted to be used in connection with the ordinary street railway appliances.

The system consists in the arrangement of circuits and means for bringing different portions of the circuits into use to convey the current to the motor. In the arrangements of the circuits, I run a main feeder along the entire road to be equipped, and at various points along the route. I run branch feeders from the main feeder to boxes or cases. From each of the said boxes I run a series of branch wires, each wire being connected with a block or section of metal which is securely fixed in the road-bed with only its upper surface exposed. Each of the boxes contains a group of magnets corresponding in number to one-half of the number of branch wires leading to the metal-blocks in the street. The said boxes or cases may be located at or in any convenient place.

I will now describe the manner by which the motor receives its current and the operation of the magnets in the boxes while the motor is in motion.

Referring to the drawing, like figures represent like parts.

1 is the generator.
2 is the main-feeder.
3 is the return wire or rail of the railway.
4 is a motor.
5 is a resistance coil placed in the magnet circuit to cut down the current passing through magnet 6.
7 is a shoe or brush arranged beneath the motor-car.
8 indicates the metal blocks which are arranged in the street between the rails of the roadway.
9 indicates the branch feeders.
10 indicates the magnet branch wires.
11 indicates the armature-branch wires.
12 indicates the grounded motor wheel.

In the operation of the system the shoe or brush 7 which is arranged beneath the car, is in constant connection with at least three of the metal blocks 8. Now, to start the motor from the first station, it is necessary to close the circuit through the magnet armature which at that moment is in electrical connection with the motor through the shoe or brush 7. The current will then pass from the main feeder 2 to the branch feeder 9, thence to armature 13, then over wire 11 to brush 7, where the current divides. A very small portion will shunt from the brush through magnet circuits 8, 5, 10 and magnet 6 to ground, thereby vitalizing the said magnet. The largest portion of the current will pass through the brush and may be utilized in the motor.

The motor when moving in either direction shunts a portion of the current from the main feeder through one armature circuit to the magnet circuit in advance of the motor car.

I do not limit myself to the particular arrangement of circuits as herein shown and described, as many combinations of circuits may be made which come within the scope of my claims hereinafter made.

What I claim as my invention is—

1. In an electric railway, a system of electrical distribution composed of a group of electro-magnetic circuit controllers outside of the road-bed and arranged to be easily accessible, each controller being electrically connected with one exposed terminal head in the road-bed.

2. In an electric railway, a system of electrical distribution composed of groups of electro-magnetic controllers outside of the road-bed and arranged to be easily accessible, each of said controllers being electrically connected with one terminal in the road-bed contiguous to the brush of the operating-car.

3. In an electric railway system the combination of a generator, its leads, a plurality of feeders from one of said leads, one or more branch wires from each of said feeders, a terminal contact block or section of metal for each of said branch wires, groups of magnetic circuit controllers each controller being adapted to control the connection to one of said blocks or sections, supplementary blocks and connections therefrom through the controller magnets to the opposite lead, and a current collecting contact carried by the car and adapted to shunt a portion of the main current through the supplementary blocks and controller magnets.

4. In an electric railway, a system composed of a main feeder and return rail in the road-bed, with exposed terminal heads or blocks at intervals along the road-bed and in combination with and intermediate between the main feeder and the terminal heads accessible switching mechanism located at any point distant from the road-bed, but connected electrically with said main feeder and blocks whereby the make-and-break mechanism of each block is not located in the road-bed but placed at suitable points adjacent to the road along the entire route in groups, to form distributing-stations.

5. In an electric railway system, a main feeder and a return rail in the road-bed and terminal heads or blocks at intervals along the route, with an accessible electro-magnetical cut-out or switch between each terminal head and the main feeder located out of the road-bed all of the parts being so arranged that as the car moves along the brush is constantly in contact with one terminal and engages with the second terminal before leaving the first terminal as set forth and shown.

6. In an electric railway system a generator of electric energy, a main feeder, a plurality of distributing feeders connected thereto, and a return rail on the road-bed, a series of exposed contacts arranged apart along the route, with an accessible electro-magnetic circuit controller between each exposed contact and the main feeder, the said controllers for a given section of the road being arranged in close proximity to each other, with circuit connections by which they may be operated by currents from the main feeder or lead substantially as set forth.

7. In an electric railway, a generator, its leads, a plurality of feeders from one of said leads, exposed circuit contacts arranged at intervals and in series along the road way, circuit wires leading from each of the said contacts to a distributing box or station for that section of the road, automatically acting circuit controllers connected in circuit between the said exposed contacts and the feeder, an auxiliary branch wire which includes a high resistance and is permanently connected to the opposite lead, and a current collecting contact carried by the car and adapted to shunt a portion of the main current through the said circuit connections which include the high resistance, substantially as set forth.

8. The combination of the generator and its leads, a plurality of feeders therefrom, a plurality of branches for each feeder, their exposed contacts, auxiliary circuits which are permanently connected with the return lead, a resistance included in the said auxiliary circuits, circuit controllers included therein, the exposed circuit controlling contact of the auxiliary circuits, the arrangement being such that current sent through the auxiliary circuit will actuate the circuit controller included in its circuit, independent of the direction of the motion of the car upon the road.

Signed at New York, in the county of New York and State of New York, this 31st day of October, A. D. 1891.

OSCAR A. ENHOLM.

Witnesses:
ELLA F. BRAMAN,
MAY JONES.